Feb. 16, 1943.  E. H. HERBERT  2,311,229
PUMP
Filed April 19, 1941
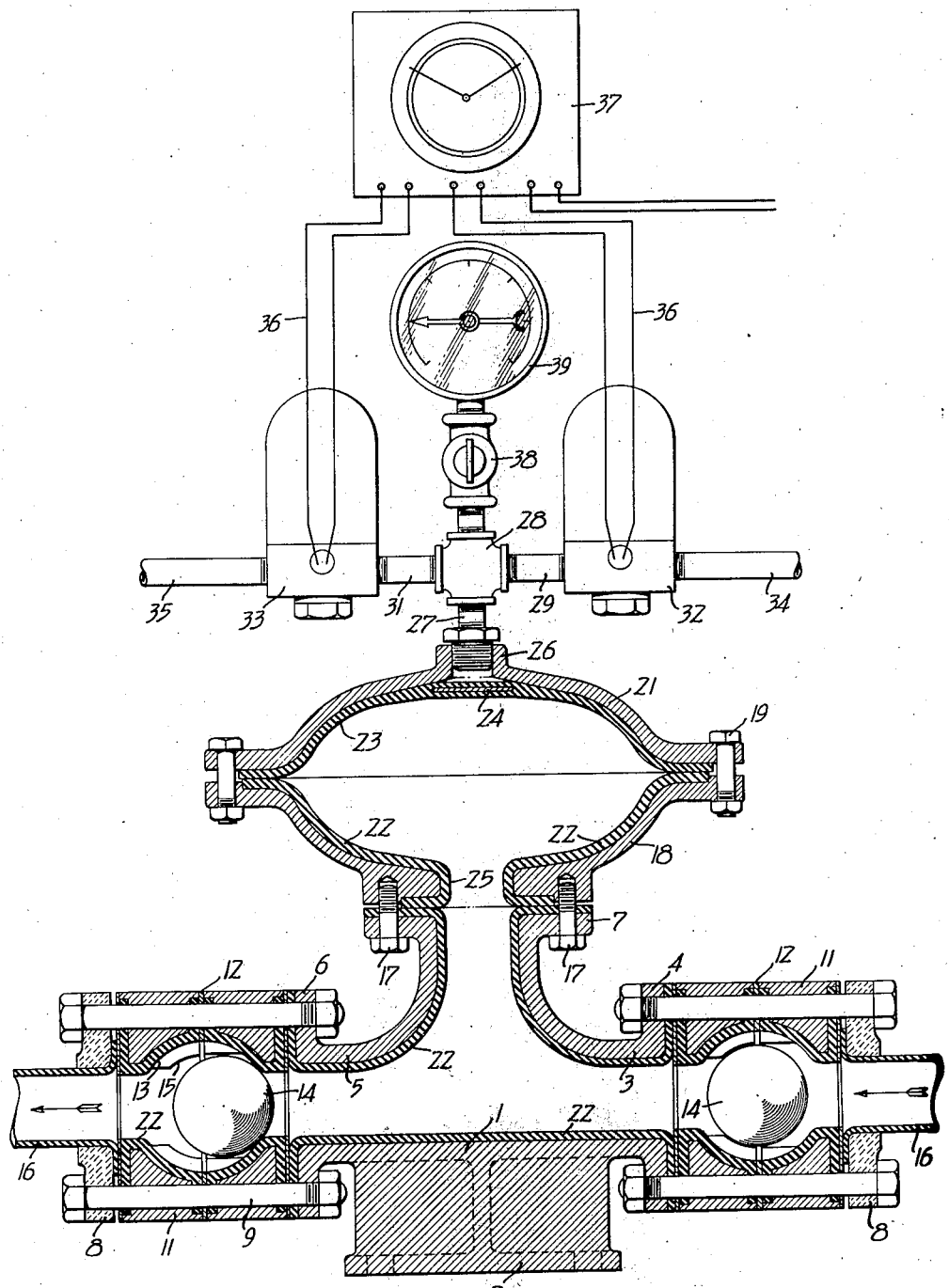
INVENTOR
ELMER H. HERBERT
BY
ATTORNEY

Patented Feb. 16, 1943

2,311,229

UNITED STATES PATENT OFFICE 2,311,229

PUMP

Elmer H. Herbert, Oakland, Calif., assignor to Oliver United Filters Incorporated, Oakland, Calif., a corporation of Nevada Application April 19, 1941, Serial No. 389,363

2 Claims. (Cl. 103—152)

This invention relates in general to a diaphragm pump and more particularly to a diaphragm pump in which the diaphragm is actuated by a differential fluid pressure.

In general, the object of this invention is the provision of a diaphragm pump in which the diaphragm is made to osciallate from one side to the other of a central plane without being stretched, whereby the capacity of the pump is materially increased and the wear on the diaphragm is materially decreased.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing, in the single figure of the drawing, a solenoid-operated diaphragm pump embodying the objects of my invention is shown in section with the solenoids and electrical circuit diagrammatically illustrated.

As shown in this drawing, the pump comprises a central inverted T 1 having a base 2 by means of which the entire pump assembly can be bolted to any suitable support. Formed on the inlet 3 of the T is a flange 4, and formed on the outlet 5 of the T is a flange 6. The vertical leg of the T is likewise formed with a flange 7.

Bolted between each of the flanges 4 and 6 and rings 8 by bolts 9 is a check valve body 11 split intermediate its ends on a plane at right angles to its axis and provided with a gasket 12 for effecting a fluid tight seal between its two halves. The check valve bodies 11 are each provided with a spherical chamber 13 for the accommodation of a ball check 14 and with a plurality of longitudinally extending ribs 15 for limiting the forward (left hand) movement of the ball check 14. From this construction it will be noted that each of the ball checks 14 is closed only when in its right hand position and open in every other position which it can possibly assume.

Clamped between each of the rings 8 and each of the valve bodies 11 is a pipe fitting 16. The right hand pipe fitting 16 can be used to establish communication between the source of the material to be pumped and the left hand pipe fitting, with the receptacle into which such material is to be pumped.

Secured to the flange 7 of the T 1 by screws 17 is an outwardly flanged, downwardly dished pump casing 18, and bolted to the flange of the casing by bolts 19 is an upwardly concave outwardly flanged pump cover 21.

All of the surfaces of the T 1, the valve bodies 11, and the pump casing 18 exposed to contact with the material to be pumped can if desired be coated with a lining 22 of rubber or other material for withstanding the corrosive action of such material.

Clamped between the flanges of the casing 18 and the cover 21 is a pliable diaphragm 23 made of gum rubber or other suitable material and which should be molded so as naturally to conform to the contour of the casing 18 or cover 21. Molded in the center of the diaphragm 23 is a brass disc 24 of a diameter at least as great as the central opening 25 in the pump casing 18. By being so reinforced, the diaphragm 23 is prevented from being forced into the opening 25 and is thereby relieved of undue stress and strain at this point.

Formed centrally of the cover 21 is an internally threaded boss 26 to which is threaded a nipple 27 communicating with a cross pipe fitting 28. Threaded to one of the lateral sides of the fitting 28 is a nipple 29 and threaded to the opposite side of this fitting is a nipple 31. The nipples 29 and 31 respectively communicate with solenoid-operated valves 32 and 33 which in turn communicate respectively through pipes 34 and 35 with sources of fluid under different pressures. For example, the pipe 34 may communicate with a source of superatmospheric pressure while the pipe 35 may be in communication with either a source of atmospheric pressure or a source of subatmospheric pressure. Furthermore, gravity may be relied upon to either charge or discharge the pump. If gravity is utilized to charge the pump then a positive pressure must be used to discharge the pump. If gravity is used to discharge the pump, then a subatmospheric pressure must be used to charge the pump.

The solenoid valves 32 and 33 are operated through a conventional electric circuit 36 from a clock 37 of any suitable type.

The upper side of the cross pipe fitting 28 is connected through a valve 38 with a pressure or vacuum gauge 39.

The clock 37 serves alternately to open and close the solenoid valves 32 and 33 and consequently to cause the diaphragm 23 to oscillate between the floor of the casing 18 and the ceiling of the cover 21. On the upstroke of the diaphragm 23 the right hand intake ball check 14 will be open and the left hand outlet ball check 14 closed. On the downstroke of the diaphragm 23, the positions of these ball checks will be reversed.

By making the pump casing cover 21 upwardly concave and by molding the diaphragm to normally conform to the contour of either one or the other of these members, the capacity of the pump is naturally increased and the diaphragm is not subjected to undue stresses and strains.

I claim:

1. A diaphragm pump comprising: a downwardly concave casing; an upwardly concave cover disposed over said casing; a diaphragm of pliable material clamped by its marginal edges between said casing and said cover, said diaphragm being arranged normally to conform to the contour of either the casing or its cover without any substantial stretching; a casing inlet conduit communicating with said casing and provided with an outwardly closing check valve; a casing outlet conduit communicating with said casing and provided with an inwardly closing check valve; valved inlet and outlet cover conduits communicating with the under side of said cover; and time-controlled means for actuating the valves in said cover conduits independently of the movement of said diaphragm.

2. A diaphragm pump comprising: a downwardly concave casing; an upwardly concave cover disposed over said casing; a diaphragm of pliable material clamped by its marginal edges between said casing and said cover, said diaphragm being arranged normally to conform to the contour of either the casing or its cover without any substantial stretching; a casing inlet conduit communicating with said casing and provided with an outwardly closing check valve; a casing outlet conduit communicating with said casing and provided with an inwardly closing check valve; a valved cover inlet conduit for establishing communication between the under side of said cover and a source of superatmospheric pressure; a valved cover outlet conduit for establishing communication between the under side of said cover and a source of subatmospheric pressure; and time-controlled means for actuating the valves in said cover conduits independently of the movement of said diaphragm.

ELMER H. HERBERT.